US010544708B2

(12) United States Patent
McCarthy, Jr. et al.

(10) Patent No.: US 10,544,708 B2
(45) Date of Patent: Jan. 28, 2020

(54) SPLIT AXIAL CAM SHIFTING SYSTEM VARIABLE VALVE ACTUATION FUNCTIONS

(71) Applicant: Eaton Corporation, Cleveland, OH (US)

(72) Inventors: James E. McCarthy, Jr., Kalamazoo, MI (US); Philip William Wetzel, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 162 days.

(21) Appl. No.: 15/722,649

(22) Filed: Oct. 2, 2017

(65) Prior Publication Data
US 2018/0023424 A1 Jan. 25, 2018

Related U.S. Application Data

(63) Continuation of application No. PCT/US2016/025548, filed on Apr. 1, 2016.
(Continued)

(51) Int. Cl.
*F01L 1/34* (2006.01)
*F01L 1/053* (2006.01)
(Continued)

(52) U.S. Cl.
CPC .......... *F01L 1/053* (2013.01); *F01L 13/0005* (2013.01); *F01L 13/06* (2013.01);
(Continued)

(58) Field of Classification Search
CPC . F01L 1/2405; F01L 1/053; F01L 1/38; F01L 13/0005; F01L 13/06;
(Continued)

(56) References Cited

U.S. PATENT DOCUMENTS 5,855,191 A * 1/1999 Blowers ............... F01L 1/2405
123/90.35
7,252,054 B2 * 8/2007 Weber ............... F01L 13/0015
123/559.1
(Continued)

FOREIGN PATENT DOCUMENTS

JP  2012167593 A  9/2012
JP  2013185462 A  9/2013

OTHER PUBLICATIONS

International Search Report and Written Opinion for International Application No. PCT/US2016/025548 dated Jun. 29, 2016, 17 pages.

*Primary Examiner* — Zelalem Eshete
(74) *Attorney, Agent, or Firm* — RMCK Law Group PLC

(57) ABSTRACT

A valve train assembly configured to selectively open and close intake and exhaust valves associated with cylinders of an internal combustion engine comprises an intake rocker arm assembly, an intake cam assembly, a first axial shifting cam assembly and a second axial shifting cam assembly. The intake rocker arm assembly can have a plurality of intake rocker arms. The intake cam assembly can be associated with each of the cylinders and can have three distinct cam profiles including a first cam profile, a second cam profile and a third cam profile. The first axial shifting cam assembly can operate independently from the second axial shifting cam assembly to provide three distinct valve lift profiles on the first grouping of cylinders and three distinct valve lift profiles on the second grouping of cylinders.

26 Claims, 6 Drawing Sheets

Related U.S. Application Data

(60) Provisional application No. 62/142,425, filed on Apr. 2, 2015, provisional application No. 62/142,996, filed on Apr. 3, 2015.

(51) Int. Cl.
*F01L 13/00* (2006.01)
*F01L 13/06* (2006.01)

(52) U.S. Cl.
CPC . *F01L 2001/0537* (2013.01); *F01L 2013/001* (2013.01); *F01L 2013/0052* (2013.01)

(58) Field of Classification Search
CPC ....... F01L 2001/0537; F01L 2013/0052; F01L 2013/101; F01L 2013/001; F01L 2105/00; Y02T 10/142
See application file for complete search history.

(56) References Cited

U.S. PATENT DOCUMENTS

| | | |
|---|---|---|
| 2011/0048352 A1 | 3/2011 | Hendriksma |
| 2014/0238326 A1* | 8/2014 | Kashiwabara .......... F01L 1/047 123/90.18 |
| 2014/0261267 A1 | 9/2014 | Woo et al. |
| 2015/0047589 A1 | 2/2015 | Moran et al. |

\* cited by examiner

| Engine Configuration | Intake/ Exhaust | Cylinders 1-3 | | | Cylinders 4-6 | | |
|---|---|---|---|---|---|---|---|
| | | Lobe A | Lobe B | Lobe C | Lobe A | Lobe B | Lobe C |
| 1 | Intake | Normal | CDA | LIVC-1 | Normal | LIVC-2 | LIVC-1 |
| 1 | Exhaust | Normal | CDA | I-EGR1 | Normal | EEVO or Alt. | I-EGR1 |
| 2 | Intake | Normal | CDA | EIVC-1 | Normal | EIVC-2 | EIVC-1 |
| 2 | Exhaust | Normal | CDA | I-EGR1 | Normal | I-EGR2 or Alt. | I-EGR1 |

FIG - 5

| Engine Configuration | Intake/ Exhaust | Cylinders 1-3 | | | Cylinders 4-6 | | |
|---|---|---|---|---|---|---|---|
| | | Lobe A | Lobe B | Lobe C | Lobe A | Lobe B | Lobe C |
| 1 | Intake | Normal | CDA | LIVC-1 | Normal | LIVC-2 | LIVC-1 |
| 1 | Exhaust | Normal | CDA or other | Brake | Normal | CDA or other | Brake |
| 2 | Intake | Normal | CDA | EIVC-1 | Normal | EIVC-2 | EIVC-1 |
| 2 | Exhaust | Normal | CDA or other | Brake | Normal | CDA or other | Brake |

*FIG - 6*

SPLIT AXIAL CAM SHIFTING SYSTEM VARIABLE VALVE ACTUATION FUNCTIONS

CROSS-REFERENCE TO RELATED APPLICATIONS

This application is a continuation of International Application No. PCT/US2016/025548 filed Apr. 1, 2016, which claims priority to U.S. Provisional Application Nos. 62/142,425 filed on Apr. 2, 2015, and 62/142,996 filed on Apr. 3, 2015 which are incorporated by reference in its entirety as if set forth herein.

FIELD

The present disclosure relates generally to an axial cam shifting valve assembly and, more particularly, to an axial cam shifting valve assembly that controls the opening and closing of intake and exhaust valves on a first half of the engine cylinders independently from a second half of the engine cylinders.

BACKGROUND

Combustion cycles on four-stroke internal combustion engines can be modified to achieve various desired results such as improved fuel economy. In one method, the expansion stroke is increased relative to the compression stroke. The effect is sometimes referred to as a Miller Cycle or as an Atkinson Cycle. The Miller and Atkinson Cycles can be achieved by either closing the intake valve earlier than a normal or Otto Cycle ("Base") with a shorter than normal intake valve lift duration ("EIVC"), or by closing the intake valve later by a longer than normal intake valve lift profile ("LIVC").

Recent automotive and truck industry trends have placed increased importance on the reduction of fuel consumption and emissions of the internal combustion engine. One method of reducing fuel consumption is to optimize air intake and exhaust into the cylinders through incorporation of discrete valve profiles. Various systems have been developed for altering the valve-lift characteristics for internal combustion engines. Such systems, commonly known as variable valve timing (VVT) or variable valve actuation (WA), improve fuel economy, reduce emissions and improve drive comfort over a range of speeds.

Current axial cam shifting systems are limited to two discrete positions and thus two discrete valve lift profiles offering two valve lift functions. A two position system allows a simple actuation system that only needs to translate the axial shifting components to either a front or a rear position. Mechanical stops can be designed into the system to stop the components in the correct positions for positive axial location. While the current systems are satisfactory for their intended purpose it is desirable to provide more than two discrete valve lift profiles to further optimize the valve system for a given application and operating condition.

SUMMARY

A valve train assembly configured to selectively open and close intake and exhaust valves associated with cylinders of an internal combustion engine comprises an intake rocker arm assembly, an intake cam assembly, a first axial shifting cam assembly and a second axial shifting cam assembly. The intake rocker arm assembly can have a plurality of intake rocker arms. The intake cam assembly can be associated with each of the cylinders and can have three distinct cam profiles including a first cam profile, a second cam profile and a third cam profile. The first axial shifting cam assembly can be movable between a first, second and third axial position corresponding to alignment of the respective three distinct cam profiles with intake rocker arms associated with a first grouping of cylinders. The second axial shifting cam assembly can be movable between a first, second and third axial position corresponding to alignment of the respective three distinct cam profiles with intake rocker arms associated with a second grouping of cylinders, distinct from the first grouping of cylinders. The first axial shifting cam assembly can operate independently from the second axial shifting cam assembly to provide three distinct valve lift profiles on the first grouping of cylinders and three distinct valve lift profiles on the second grouping of cylinders.

The intake cam assembly associated with the first grouping of cylinders can include the first cam profile that provides a normal mode. The second cam profile can provide a cylinder deactivation mode. The third cam profile can provide a first Miller cycle mode. The intake cam assembly associated with the second grouping of cylinders comprises the first cam profile that provides a normal mode. The second cam profile provides a first Miller cycle mode. The third cam profile provides a second Miller cycle mode. The first Miller cycle mode can comprise a late intake valve closing event. A first axial shifting cam assembly can include three cam assemblies having a central cam assembly that operates as a master actuation system and two outer cam assemblies that operate as slave actuation systems. The first grouping of cylinders can comprise a first cylinder, a second cylinder and a third cylinder of the internal combustion engine. The second axial shifting cam assembly includes three cam assemblies having a central cam assembly that operates as a master actuation system and two outer cam assemblies that operate as slave actuation systems. The second grouping of cylinders can comprise a fourth cylinder, a fifth cylinder and a sixth cylinder.

According to other features, the valve train assembly can further include an exhaust cam assembly, a third axial shifting cam assembly and a fourth axial shifting cam assembly. The exhaust cam assembly can be associated with each of the cylinders and have three distinct cam profiles including a first cam profile, a second cam profile and a third cam profile. The third axial shifting cam assembly can be movable between a first, a second and a third axial position corresponding to alignment of the respective three distinct cam profiles of the exhaust cam assembly with exhaust rocker arms associated with the first grouping of cylinders. The fourth axial shifting cam assembly can be movable between a first, a second and a third axial position corresponding to alignment of the respective three distinct cam profiles with exhaust rocker arms associated with the second grouping of the cylinders. The third axial shifting cam assembly operates independently from the fourth axial shifting cam assembly to provide three distinct valve lift profiles on the first grouping of cylinders and three distinct valve lift profiles on the second grouping of cylinders.

According to additional features, the exhaust cam assembly associated with the first grouping of cylinders comprises the first cam profile that provides normal mode, the second cam profile that provides cylinder deactivation mode and the third cam profile that provides an exhaust gas recirculation mode. The exhaust cam assembly associated with the second grouping of cylinders can comprise the first cam profile that provides a normal mode, the second cam profile that provides an early exhaust valve opening mode, the third cam profile that provides an exhaust gas recirculation mode. A deactivating lash adjuster can have a lost motion device and be movable between an activated position where the lost motion device does not absorb a force exerted by the associated rocker arm assembly, and a deactivated position where the lost motion device at least partially absorbs the force exerted by the associated rocker arm assembly.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

It will be appreciated that the illustrated boundaries of elements in the drawings represent only one example of the boundaries. One of ordinary skill in the art will appreciate that a single element may be designed as multiple elements or that multiple elements may be designed as a single element. An element shown as an internal feature may be implemented as an external feature and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

FIG. 5 is a table illustrating various operating combinations available with the actuation system of the present disclosure;

FIG. 6 is a table illustrating various operating combinations available with the actuation system shown in FIG. 5 but with one of the lobes modified to accommodate a braking function.

DETAILED DESCRIPTION

Figure 1:
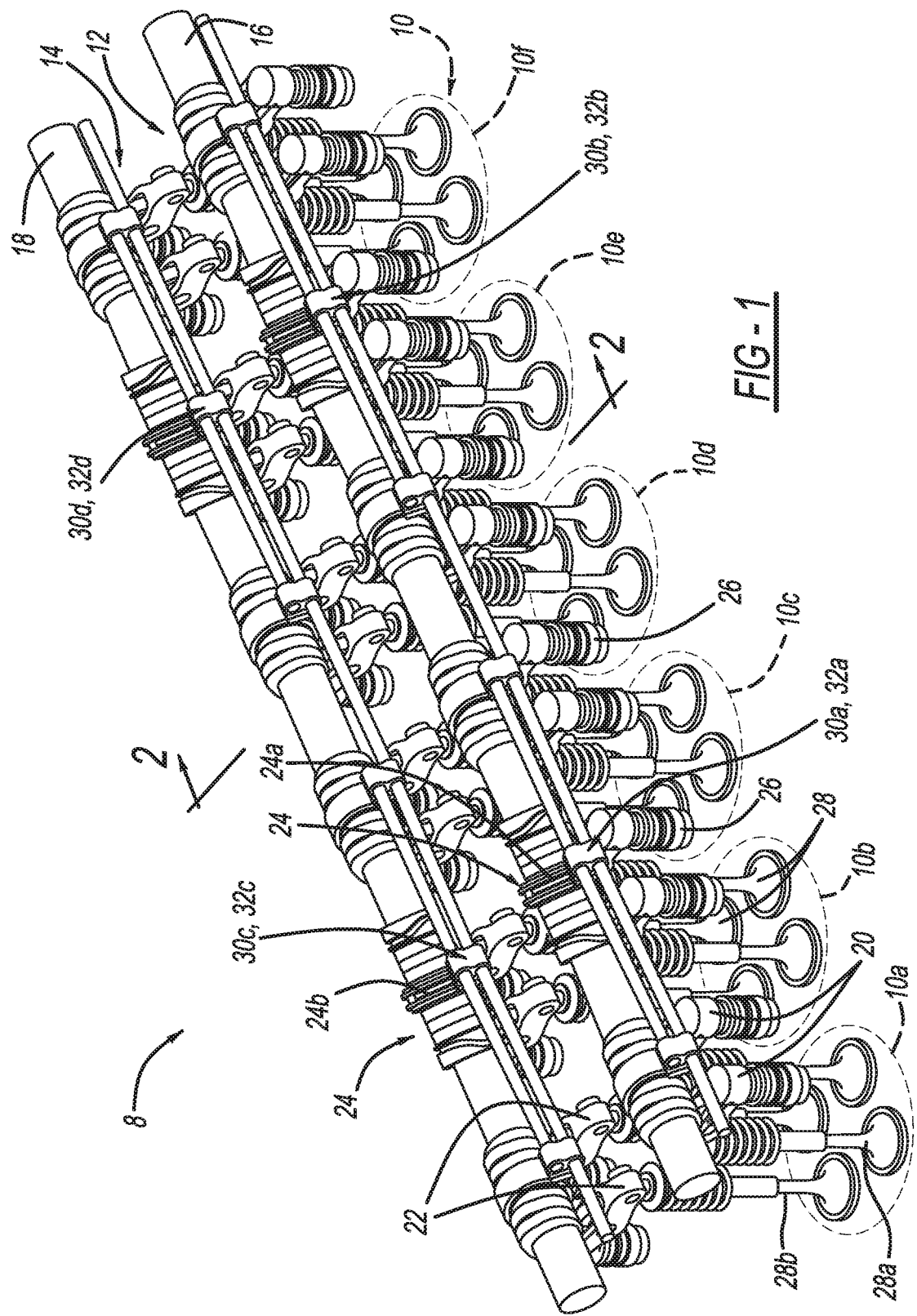
FIG. 1 is a perspective view of a valve train assembly incorporating a series of rocker arm assemblies constructed in accordance with one example of the present disclosure.

With initial reference to FIGS. 1-4, a valve train assembly constructed in accordance with one example of the present disclosure is shown and generally identified at reference 8. The valve train assembly 8 is a Type II valve train and can be configured for use in an engine having six cylinders collectively referred to at reference numeral 10 and individually identified at reference numerals 10a, 10b, 10c, 10d, 10e, and 10f. However, it will be appreciated that the present teachings are not so limited. In this regard, the present disclosure may be used in any valve train assembly and can further be adapted for use in engines having different amounts of cylinders. The valve train assembly 10 can include a series of intake rocker arm valve assemblies 12 and a series of exhaust rocker arm valve assemblies 14. An intake camshaft 16 can be operably associated with the intake rocker arm valve assemblies 12, and an exhaust camshaft 18 can be operably associated with the exhaust rocker arm valve assemblies 14. The camshafts 16, 18 can rotate, for example, based on a rotatable input from a timing chain or belt linkage connected to a crankshaft of the engine (not shown).

The rocker arm assemblies 12, 14 may respectively include intake rocker arms 20 and exhaust rocker arms 22, each configured for operation with a lobed cam assembly 24, a lash adjuster 26, and an engine cylinder valve 28 for an internal combustion engine cylinder (not shown). The engine cylinder valves 28 can more specifically include intake valves 28a and exhaust valves 28b. In the example provided the intake and exhaust valves 28a and 28b are constructed similarly. The cam assemblies 24 can more specifically include intake cam assemblies 24a and exhaust cam assemblies 24b. In the example provided, the intake and exhaust cam assemblies 24a and 24b can be constructed similarly.

The intake cam assemblies 24a can be arranged on the intake camshaft 16 and are configured to selectively engage one of the intake rocker arm assemblies 12. The exhaust cam assemblies 24b can be arranged on the exhaust camshaft 18 and are configured to selectively engage one of the exhaust rocker arm assemblies 14. The cam assemblies 24a and 24b can be configured for an axial cam shifting operation where the respective cam assembly 24a, 24b can be moved axially along the respective intake and exhaust camshafts 16, 18 between three discrete positions. As described herein, axial movement of the respective cam assemblies 24 can control the opening height and/or timing of the respective intake valves 28a and exhaust valves 28b depending upon the axial position of the cam assembly 24.

As will become appreciated herein, the present disclosure applies variable valve actuation technology (WA) to an internal combustion engine such that the actuation mechanism (axial cam shifting) for enabling these functions is able to switch half of cylinders 10 (in this example three of the six cylinders) independently from the other half of the cylinders. More particularly, a first actuating system 30a can include an axial cam shifting assembly 32a that is configured to control the intake valves 28a associated with three cylinders 10a, 10b and 10c. A second actuating system 30b can include an axial cam shifting assembly 32b that is configured to control the intake valves 28a associated with the three cylinders 10d, 10e and 10f. A third actuating system 30c can include an axial cam shifting assembly 32c that is configured to control the exhaust valves 28b associated with the three cylinders 10a, 10b and 10c. A fourth actuating system 30d can include an axial cam shifting assembly 32d that is configured to control the exhaust valves 28b associated with the three cylinders 10d, 10e and 10f.

The valve train assembly 8 includes three different functions or cam positions (for each actuating system 30a, 30b, 30c and 30d). The functions include a primary function and two secondary functions. Some valve functions, such as cylinder deactivation (CDA) is typically only needed on half of the cylinders of the engine. In this type of arrangement with the actuation system being spit, when three cylinders 10 move out of the primary function (normal valve lift) and into CDA mode (one of the secondary functions), the other three cylinders 10 can stay in one of the three modes including normal valve operation (primary mode), or one of the two secondary modes that could include specific valve lift timing and duration to complement CDA on the intake valves 28a. Similarly, a split actuation system (e.g. actuating systems 30c and 30d) can also work on the exhaust valves 28b by enabling three cylinders 10 to be deactivated while the other three cylinders 10 can use up to three different exhaust valve lift and duration events. The various combinations will be more specifically described herein and are shown in FIGS. 5 and 6.

Figure 2:
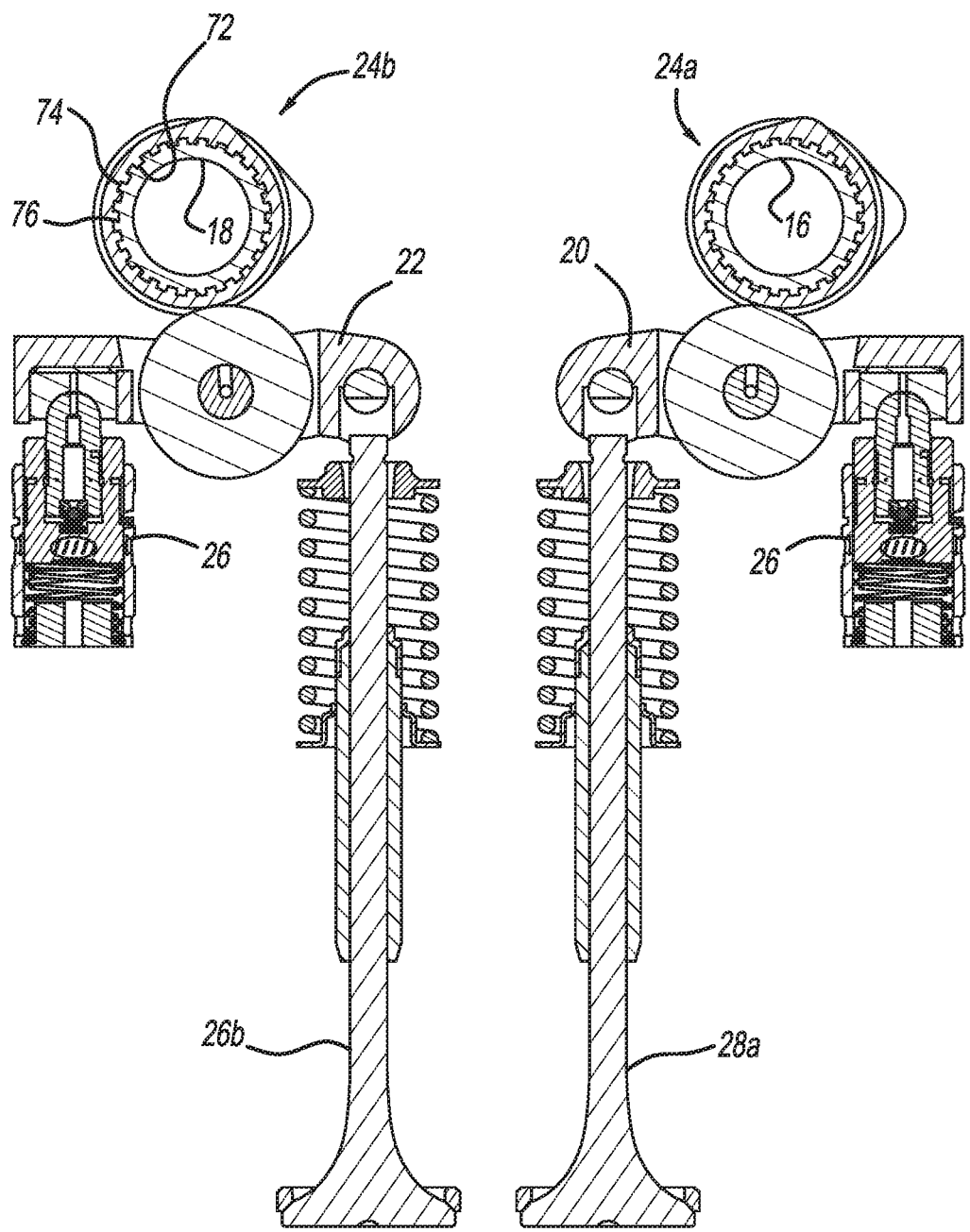
FIG. 2 is a cross-sectional view of the valve train assembly shown in FIG. 1 and taken along line 2-2.
Figure 3:
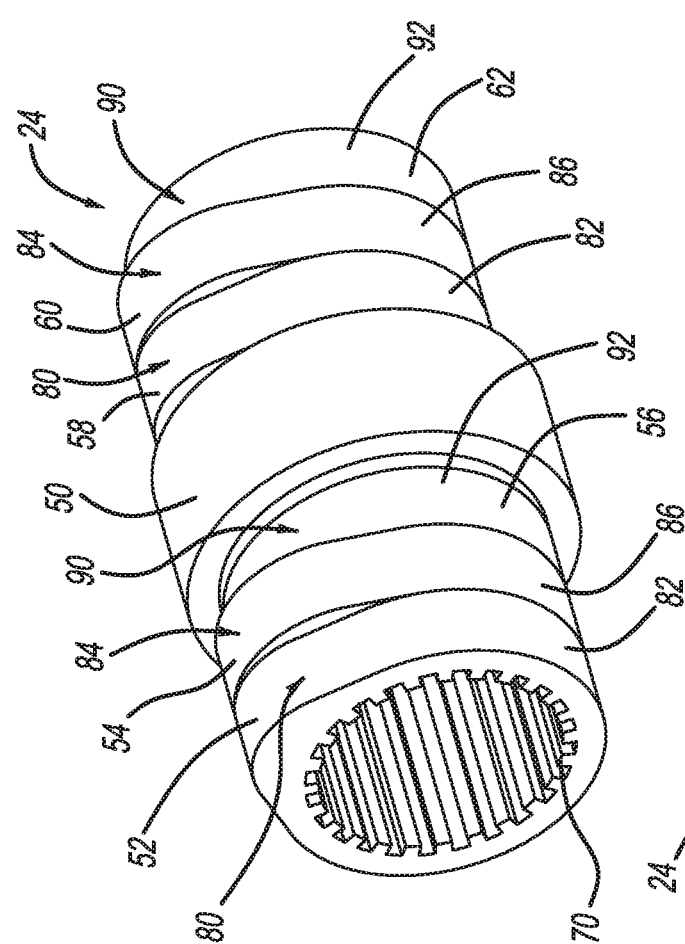
FIG. 3 is a perspective view of a cam assembly shown in FIG. 1 constructed in accordance with one example of the present disclosure.
Figure 4:
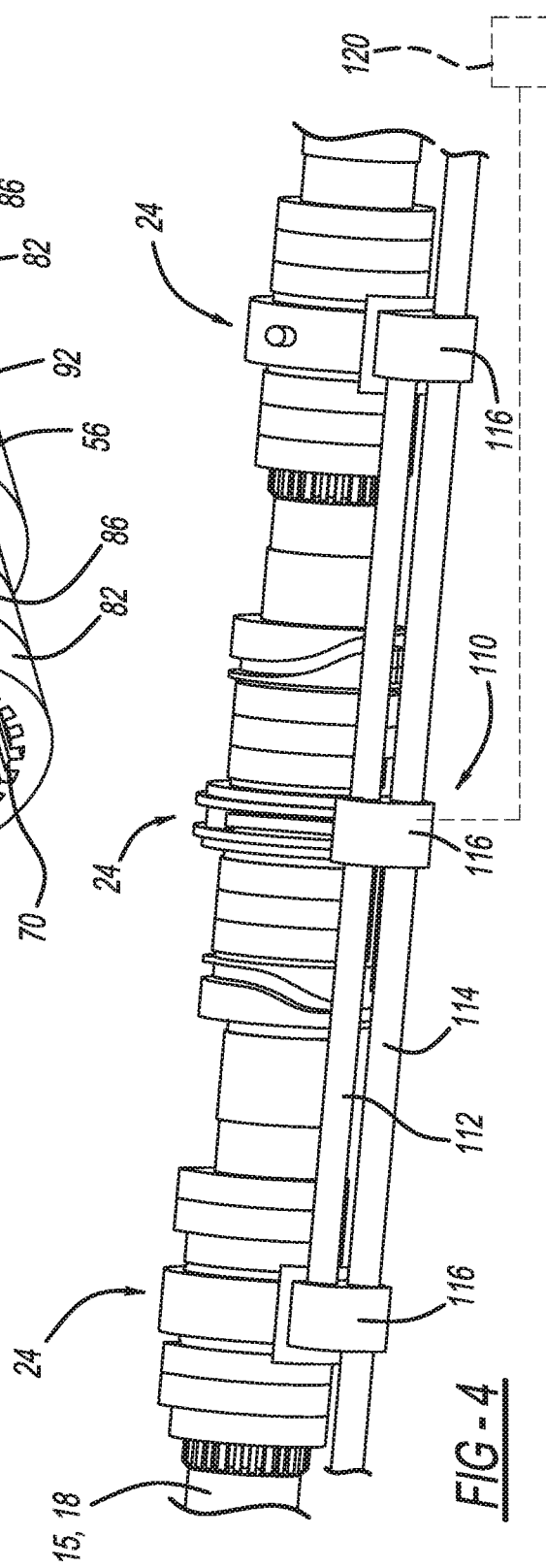
FIG. 4 is a perspective view of a partial valve train assembly incorporating a master-slave actuation system constructed in accordance with one example of the present disclosure.

Turning now to FIG. 4, each cam assembly 24 can include a body 50, a first cam 52, a second cam 54, a third cam 56, a fourth cam 58, a fifth cam 60 and a sixth cam 62. The body 50 can be tubular and include in inner diameter or inner surface 70, which can be configured to receive the rotatable camshaft 16, 18. For example, as illustrated in FIG. 2, the inner surface 70 may include a plurality of teeth 72 configured to meshingly engage teeth 74 formed on an outer surface 76 of the camshaft 16, 18.

The first and fourth cams 52, 58 can have a first lobe or lift profile 80 and a base circle 82. The second and fifth cams 54 and 60 can have a second lobe or lift profile 84 and a base circle 86. The third and sixth cams 56 and 62 can have a third lobe or lift profile 90 and a base circle 92. In the illustrated example, the first lift profiles 80 are angularly aligned and offset from both the second lift profiles 84 and the third lift profiles 90, which are respectively angularly aligned. Although each cam is illustrated as having a single lobe, each cam may have any suitable number of additional lobes to achieve separate or similar valve lift events. In one example, lobe 90 may be absent or sized to perform a cylinder deactivation instead of or in addition to lash adjuster 26.

FIG. 4 illustrates a master-slave actuation system 110 configured to switch the cam assembly between the three discrete positions. Actuation system 110 can generally include a first shifting rail 112, a second shifting rail 114, and a plurality of brackets 116. The first shifting rail 112 couples adjacent cam assemblies 124, and the brackets slidably couple the first shifting rail 112 to the second shifting rail 114. Actuators such as solenoids 120 can be positioned on the master-slave actuation system 110 to switch between the three profiles when the shifting rails 112, 114 are used to move the slave profiles relative to the master profiles. In the example provided, the central cam assembly 24 operates as a master actuation system while the outer two cam assemblies 24 operate as slave actuation systems. It is appreciated that four master-slave actuation systems 110 (with independent solenoid valves) are provided in the present disclosure, or one master-slave actuation system 110 for each actuating system 30a, 30b, 30c and 30d.

With initial description to the actuating system 30a, control of the intake valves 28a on the (front) three cylinders 10a, 10b and 10c will be described. The first lift profile 80 is configured to engage the rocker arm valve 20 when the cam assembly 24a is in a first axial position, thereby achieving a first discrete valve lift event (e.g., a normal engine combustion mode, an engine brake mode, a deactivated cylinder mode, etc.). The second lift profile 84 is configured to engage the rocker arm valve 20 when the cam assembly 24a is in a second axial position, thereby achieving a second discrete valve lift event that can be distinct from the first valve lift event. The third lift profile 90 is configured to engage the rocker arm valve 20 when the cam assembly 24a is in a third axial position, thereby achieving a third discrete valve lift event that can be distinct from the first and second valve lift events.

It will be appreciated that the actuating system 30b can be configured to control cam assemblies 24a associated with the intake valves 28a on the (rear) three cylinders 10d, 10e and 10f. Again, the actuating system 30b can operate independent from the actuating system 30a providing independent or split control of the intake valves 28a on the front three cylinders 10a, 10b and 10c versus on the rear three cylinders 10d, 10e and 10f. Similarly, the actuating system 30c can be configured to control cam assemblies 24b associated with the exhaust valves 28b on the (front) three cylinders 10a, 10b and 10c. The actuating system 30d can be configured to control cam assemblies 24b associated with the exhaust valves 28b on the (rear) three cylinders 10d, 10e and 10f. In this regard, the actuating system 30c can operate independent from the actuating system 30d providing independent or split control of the exhaust valves 28b on the front three cylinders 10a, 10b and 10c versus on the rear three cylinders 10d, 10e and 10f.

With specific reference to FIG. 5, various combinations available to the present valve train assembly 8 are shown. In the example provided, the three lift profiles (i.e., 80, 84 and 90) can be configured on the intake cam assemblies 24a to achieve (1) normal valve lift, (2) Miller cycle and (3) cylinder deactivation. Miller cycling can enable higher brake thermal efficiencies by altering the effective engine compression ratio using either EIVC or LIVC. Cylinder deactivation can enable exhaust thermal management along with improvements in engine fuel economy through both open and closed cycle efficiencies. The respective HLA's 26 eliminate the need to mechanically set lash which improves the value proposition of the system disclosed herein. Again, the intake valves 28a on the front of the engine (cylinders 10a, 10b and 10c) can be controlled by the actuating system 30a while the intake valves 28a on the rear of the engine (cylinders 10d, 10e and 10f) can be controlled independently by the actuating system 30b.

The lift profiles (i.e., 80, 84 and 90) can be configured on the exhaust cam assemblies 24b to achieve (1) normal valve lift, (2) cylinder deactivation and (3) a third exhaust valve function. The exhaust valves 28b on the front of the engine (cylinders 10a, 10b and 10c) can be controlled by the actuating system 30c while the exhaust valves 28b on the rear of the engine (cylinders 10d, 10e and 10f) can be controlled independently by the actuating system 30d. The cylinder deactivation function will only be applied to three of the six cylinders 10. The system of the present disclosure is robust and particularly suited for heavy duty diesel engines that will enable VVA functions to be incorporated with hydraulic lash adjusters and no additional valvetrain switching/latching mechanisms.

Engine configuration 1 (FIG. 5) can allow operation of all six cylinders 10 in both normal and Miller cycle modes, while also supporting deactivation of three cylinders while the three remaining firing cylinders will be able to run in either normal mode, or two different Miller cycle modes. This will allow the Miller cycle valve lift to be optimized for both three cylinder and six cylinder modes. On the exhaust side, normal mode and an internal EGR mode will be achievable with all six cylinders 10. During three cylinder mode, the firing cylinders will have the additional option of operating in early exhaust valve opening mode to further increase exhaust temperatures for emissions system benefits. Configuration 2 will include both normal mode and three cylinder mode as with configuration 1, but will allow multiple internal EGR options as well as a different way to do Miller cycling. Configuration 2 will use early intake valve closing for Miller cycle whereas configuration 1 utilizes only late intake valve closing.

Among the available combinations and benefits provided by the current system include the ability to operate cylinders 10a, 10b and 10c in cylinder deactivation mode (CDA)

while operating cylinders 10d, 10e and 10f in normal mode. In another arrangement, cylinders 10a, 10b and 10c can operate in CDA while the cylinders 10d, 10e and 10f operate in Miller cycle. In another arrangement, cylinders 10a, 10b and 10c operate in CDA while cylinders 10d, 10e and 10f operate in exhaust gas recirculation (EGR) mode. In another arrangement, cylinders 10a, 10b and 10c operate in CDA mode while cylinders 10d, 10e and 10f operate in early exhaust valve opening (EEVO) mode. In another arrangement, cylinders 10a, 10b and 10c operate in EGR mode while cylinders 10d, 10e and 10f operate in EEVO mode. In another arrangement, engine braking can be used on all cylinders 10 (enables two or four stroke braking). In another arrangement, engine braking can be provided on the exhaust valves 28b while CDA is provided on the intake valves 28a.

In additional configurations, some or all of the lash adjusters 26 can be configured as deactivating lash adjusters having a lost motion device and movable between an activated position where the lost motion device does not absorb a force exerted by the associated rocker arm assembly, and a deactivated position where the lost motion device at least partially absorbs the force exerted by the associated rocker arm assembly. In this regard, a fourth function can be added to any of the actuating systems 30a, 30b, 30c, 30d, 30e and/or 30f.

Figure 7:
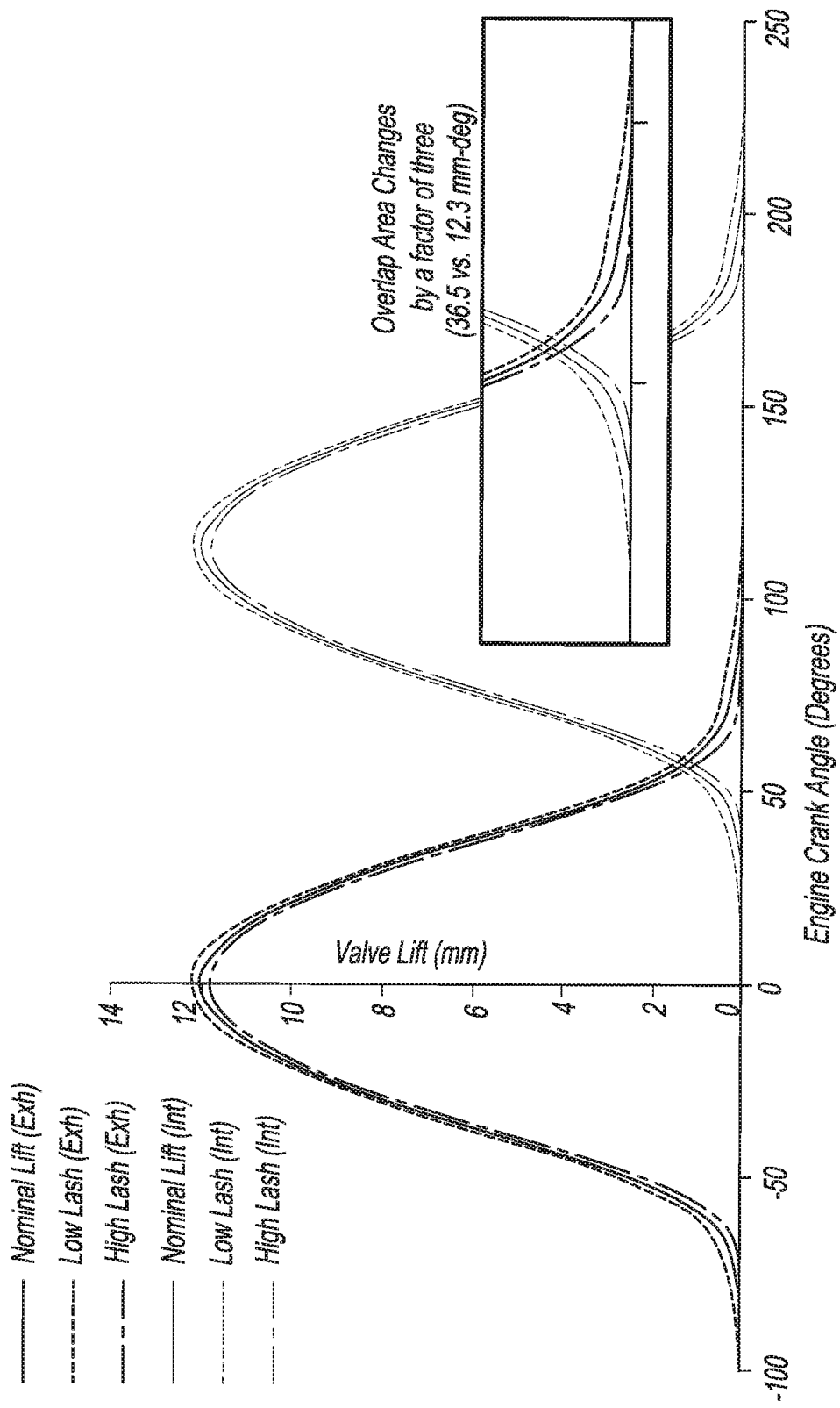
FIG. 7 illustrates exemplary lash variance on valve overlap.

FIG. 6 illustrates a similar table offering various operating combinations. In the configuration of FIG. 6, one of the lift profiles is changed to provide a braking function on the exhaust valves 28b. FIG. 7 details the large variation in valve overlap area that has to be accounted for with a mechanically lashed engine. This consistency will complement the I-EGR valve functions by making the EGR amounts very repeatable. Other benefits of using HLA's 26 include improved valvetrain dynamics (stability), reduced engine noise, lower engine service costs (no need to adjust valve lash), and improved vehicle packaging by not having to design access to the valvetrain for lash adjustment.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A valve train assembly configured to selectively open and close intake and exhaust valves associated with cylinders of an internal combustion engine, the valve train comprising:
    an intake rocker arm assembly having a plurality of intake rocker arms;
    an intake cam assembly associated with each of the cylinders and having three distinct cam profiles including a first cam profile, a second cam profile and a third cam profile;
    a first axial shifting cam assembly movable between a first, second and third axial position corresponding to alignment of the respective three distinct cam profiles with intake rocker arms associated with a first grouping of the cylinders, wherein the first axial shifting cam assembly includes three cam assemblies having a central cam assembly that operates as a master actuation system and two outer cam assemblies that operate as slave actuation systems; and
    a second axial shifting cam assembly movable between a first, second and third axial position corresponding to alignment of the respective three distinct cam profiles with intake rocker arms associated with a second grouping of the cylinders, distinct from the first grouping of cylinders;
    wherein the first axial shifting cam assembly operates independently from the second axial shifting cam assembly to provide three distinct valve lift profiles on the first grouping of cylinders and three distinct valve lift profiles on the second grouping of cylinders.

2. The valve train assembly of claim 1 wherein the intake cam assembly associated with the first grouping of cylinders comprises the first cam profile that provides a normal mode, the second cam profile that provides a cylinder deactivation mode, and the third cam profile that provides a first Miller cycle mode.

3. The valve train assembly of claim 2 wherein the intake cam assembly associated with the second grouping of cylinders comprises the first cam profile that provides a normal mode, the second cam profile that provides a first Miller cycle mode, the third cam profile that provides a second Miller cycle mode.

4. The valve train assembly of claim 3 wherein the first Miller cycle mode comprises a late intake valve closing event.

5. The valve train assembly of claim 1 wherein the first grouping of cylinders comprises a first cylinder, a second cylinder and a third cylinder of the internal combustion engine.

6. The valve train assembly of claim 5 wherein the second axial shifting cam assembly includes three cam assemblies having a central cam assembly that operates as a master actuation system and two outer cam assemblies that operate as slave actuation systems.

7. The valve train assembly of claim 6 wherein the second grouping of cylinders comprise a fourth cylinder, a fifth cylinder and a sixth cylinder.

8. The valve train assembly of claim 1, further comprising:
    an exhaust cam assembly associated with each of the cylinders and having three distinct cam profiles including a first cam profile, a second cam profile and a third cam profile;
    a third axial shifting cam assembly movable between a first, second and third axial position corresponding to alignment of the respective three distinct cam profiles of the exhaust cam assembly with exhaust rocker arms associated with the first grouping of the cylinders; and
    a fourth axial shifting cam assembly movable between a first, second and third axial position corresponding to alignment of the respective three distinct cam profiles with exhaust rocker arms associated with the second grouping of the cylinders;
    wherein the third axial shifting cam assembly operates independently from the fourth axial shifting cam assembly to provide three distinct valve lift profiles on the first grouping of cylinders and three distinct valve lift profiles on the second grouping of cylinders.

9. The valve train assembly of claim 8 wherein the exhaust cam assembly associated with the first grouping of cylinders comprises the first cam profile that provides a normal mode, the second cam profile that provides a cylinder deactivation mode, and the third cam profile that provides an exhaust gas recirculation mode.

10. The valve train assembly of claim 9 wherein the exhaust cam assembly associated with the second grouping of cylinders comprises the first cam profile that provides a normal mode, the second cam profile that provides an early exhaust valve opening mode, the third cam profile that provides an exhaust gas recirculation mode.

11. The valve train assembly of claim 1 wherein the valve train assembly is a Type II valve train.

12. The valve train assembly of claim 1, further comprising a deactivating lash adjuster having a lost motion device and movable between an activated position where the lost motion device does not absorb a force exerted by the intake rocker arm assembly, and a deactivated position where the lost motion device at least partially absorbs the force exerted by the intake rocker arm assembly.

13. A valve train assembly configured to selectively open and close intake and exhaust valves associated with cylinders of an internal combustion engine, the valve train comprising:
an exhaust rocker arm assembly having a plurality of exhaust rocker arms;
an exhaust cam assembly associated with each of the cylinders and having three distinct cam profiles including a first cam profile, a second cam profile and a third cam profile;
a first axial shifting cam assembly movable between a first, second and third axial position corresponding to alignment of the respective three distinct cam profiles with exhaust rocker arms associated with a first grouping of the cylinders, wherein the first axial shifting cam assembly includes three cam assemblies having a central cam assembly that operates as a master actuation system and two outer cam assemblies that operate as slave actuation systems; and
a second axial shifting cam assembly movable between a first, second and third axial position corresponding to alignment of the respective three distinct cam profiles with exhaust rocker arms associated with a second grouping of the cylinders, distinct from the first grouping of cylinders;
wherein the first axial shifting cam assembly operates independently from the second axial shifting cam assembly to provide three distinct valve lift profiles on the first grouping of cylinders and three distinct valve lift profiles on the second grouping of cylinders.

14. The valve train assembly of claim 13 wherein the exhaust cam assembly associated with the first grouping of cylinders comprises the first cam profile that provides a normal mode, the second cam profile that provides a cylinder deactivation mode, and the third cam profile that provides an exhaust gas recirculation mode.

15. The valve train assembly of claim 14 wherein the exhaust cam assembly associated with the second grouping of cylinders comprises the first cam profile that provides a normal mode, the second cam profile that provides an early exhaust valve opening mode, the third cam profile that provides an exhaust gas recirculation mode.

16. The valve train assembly of claim 13 wherein the first grouping of cylinders comprises a first cylinder, a second cylinder and a third cylinder of the internal combustion engine.

17. The valve train assembly of claim 16 wherein the second axial shifting cam assembly includes three cam assemblies having a central cam assembly that operates as a master actuation system and two outer cam assemblies that operate as slave actuation systems.

18. The valve train assembly of claim 17 wherein the second grouping of cylinders comprise a fourth cylinder, a fifth cylinder and a sixth cylinder.

19. The valve train assembly of claim 13 wherein the valve train assembly is a Type II valve train.

20. A valve train assembly configured to selectively open and close intake and exhaust valves associated with cylinders of an internal combustion engine, the valve train comprising:
an intake rocker arm assembly having a plurality of intake rocker arms;
an intake cam assembly associated with each of the cylinders and having three distinct cam profiles including a first cam profile, a second cam profile and a third cam profile;
a first axial shifting cam assembly movable between a first, second and third axial position corresponding to alignment of the respective three distinct cam profiles with intake rocker arms associated with a first grouping of the cylinders, wherein the first axial shifting cam assembly includes three cam assemblies having a central cam assembly that operates as a master actuation system and two outer cam assemblies that operate as slave actuation systems;
a second axial shifting cam assembly movable between a first, second and third axial position corresponding to alignment of the respective three distinct cam profiles with intake rocker arms associated with a second grouping of the cylinders, distinct from the first grouping of cylinders;
an exhaust rocker arm assembly having a plurality of exhaust rocker arms;
an exhaust cam assembly associated with each of the cylinders and having three distinct cam profiles including a first cam profile, a second cam profile and a third cam profile;
a third axial shifting cam assembly movable between a first, second and third axial position corresponding to alignment of the respective three distinct cam profiles with exhaust rocker arms associated with the first grouping of the cylinders; and
a fourth axial shifting cam assembly movable between a first, second and third axial position corresponding to alignment of the respective three distinct cam profiles with exhaust rocker arms associated with the second grouping of the cylinders;
wherein the first, second, third and fourth axial shifting cam assemblies operate independently.

21. The valve train assembly of claim 20 wherein the intake cam assembly associated with the first grouping of cylinders comprises the first cam profile that provides a normal mode, the second cam profile that provides a cylinder deactivation mode, and the third cam profile that provides a first Miller cycle mode.

22. The valve train assembly of claim 21 wherein the intake cam assembly associated with the second grouping of cylinders comprises the first cam profile that provides a normal mode, the second cam profile that provides a first Miller cycle mode, the third cam profile that provides a second Miller cycle mode.

23. The valve train assembly of claim 22 wherein the first Miller cycle mode comprises a late intake valve closing event.

24. The valve train assembly of claim 20 wherein the first grouping of cylinders comprises a first cylinder, a second cylinder and a third cylinder of the internal combustion engine.

25. The valve train assembly of claim 24 wherein the second axial shifting cam assembly includes three cam assemblies having a central cam assembly that operates as a master actuation system and two outer cam assemblies that operate as slave actuation systems.

26. The valve train assembly of claim 25 wherein the second grouping of cylinders comprise a fourth cylinder, a fifth cylinder and a sixth cylinder.

* * * * *